INVENTOR.
PETER H. OHRNBERGER
ATTORNEYS

Jan. 27, 1970 P. H. OHRNBERGER 3,491,996
CONTROL VALVE FOR HYDROSTATIC CENTERING DEVICE
Filed Jan. 26, 1967 2 Sheets-Sheet 2

INVENTOR.
PETER H. OHRNBERGER
BY
Barnes, Kisselle, Raisch & Choate
ATTORNEYS

United States Patent Office 3,491,996
Patented Jan. 27, 1970

3,491,996
CONTROL VALVE FOR HYDROSTATIC CENTERING DEVICE
Peter H. Ohrnberger, Mount Clemens, Mich., assignor to F. Jos. Lamb Co., Inc., Detroit, Mich., a corporation of Michigan
Filed Jan. 26, 1967, Ser. No. 611,998
Int. Cl. B23q *3/08;* F02b *73/06*
U.S. Cl. 269—25                                                           7 Claims

ABSTRACT OF THE DISCLOSURE

A hydrostatic centering device having two pair of opposed pistons each backed by a hydrostatic oil pocket provided with a sill to which the end of the adjacent piston cooperates to form a highly restricted exhaust passageway to drain. The oil pockets of the opposed pistons are connected to a source of oil under pressure through a control valve. The control valve has a pair of axially shiftable spools therein, one for each pair of opposed pistons. The inlet of the control valve connects with the portion of the bore for each spool. The oil pockets are connected with the opposite ends of the bore so that each spool is shifted axially in response to the pressure differential between the two associated oil pockets. Oil supply passageways are formed in each spool and extend from the inlet portion of the control valve to the opposite ends of the spool portion. The supply passageways are in the form of grooves on the outer surface of the spools of progressively increasing cross sectional area in opposite directions so that when each spool shifts axially in response to a higher pressure obtaining in one of the opposed oil pockets oil is supplied at a greater rate to the oil pocket at higher pressure.

---

This invention relates to a hydrostatic centering device and, more particularly, to a control valve for proportioning the flow from a source of oil under pressure to opposed hydrostatically controlled pistons.

The primary object of the present invention is to provide a hydrostatic centering device provided with a control valve designed to produce rapid centering with maximum centering forces so that the device as a whole will operate with maximum speed and accuracy.

More specifically the object of this invention is to provide a simple valve construction designed to direct oil from the source of oil under pressure to pairs of opposed hydrostatically controlled pistons with the rate of flow to each piston varying in accordance with the pressure at each piston so that oil under pressure is directed at a greater rate to the piston at higher pressure.

Other objects and features of the invention will become apparent from the following description and drawings in which.

In general the present invention comprises a centering device including one or more pairs of opposed pistons adapted to engage a workpiece and shift it in response to a pressure differential between hydrostatic bearings behind the pistons in each pair so that when the forces exerted on the opposite pistons of each pair are equal to the workpiece is located in the predetermined centered position. The pressure in each hydrostatic bearing is determined by a sill clearance which defines an oil exhaust passageway to drain from each hydrostatic bearing. A control valve is arranged to direct oil under pressure to the opposed bearings at a rate which varies in accordance with the pressure obtaining at each bearing so that the oil is directed to the bearing at higher pressure at a higher rate than to the bearing at lower pressure.

Figure 1:
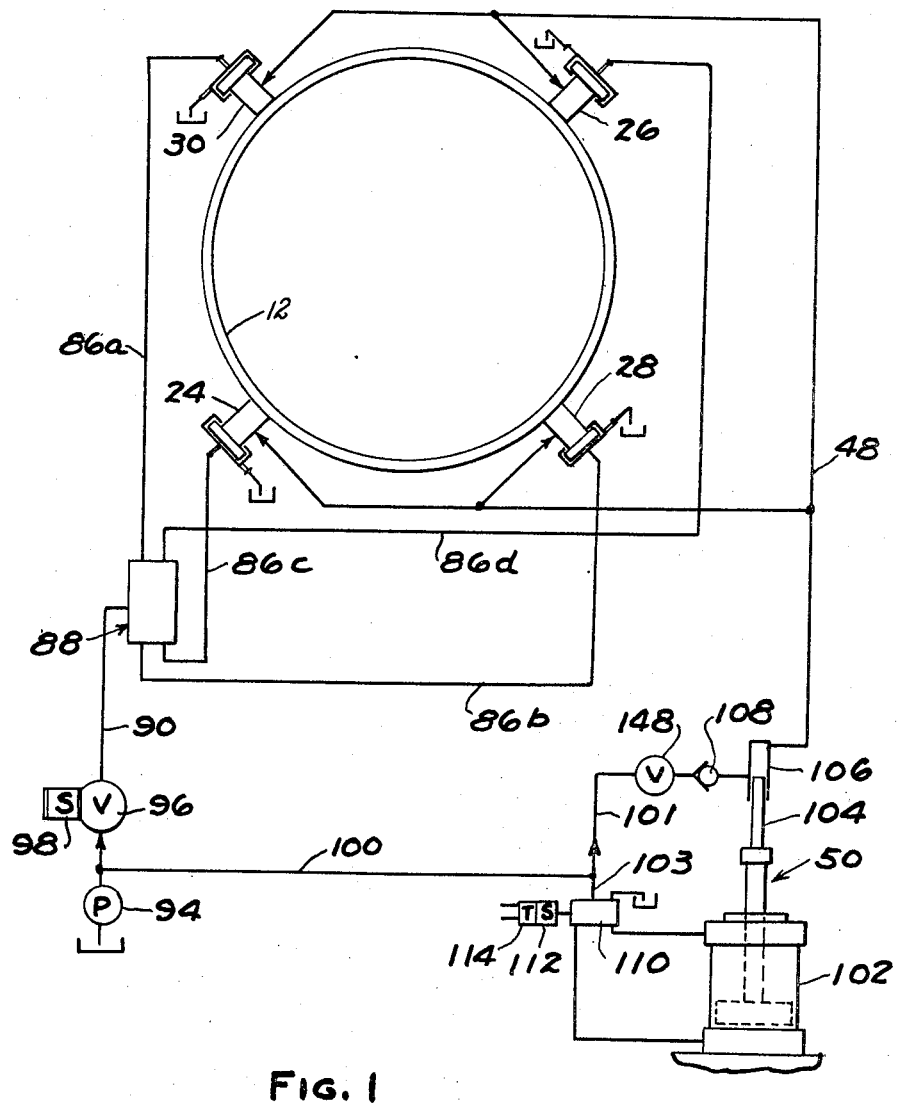
FIGURE 1 is a diagrammatic view of a hydraulic circuit for a hydrostatic centering device employing the improved valve of the present invention.
Figure 4:
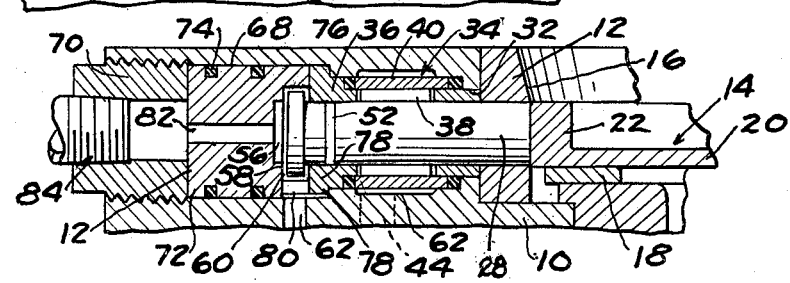
FIGURE 4 is a sectional view of one of the hydrostatic bearings employed in the centering device.
Figure 5:
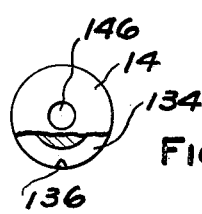
FIGURE 5 is an end view, partly in section of the valve spool.

Referring to the drawings and particularly to FIGS. 1 and 4, the centering device of this invention includes a base 10 having fixedly mounted thereon a ring 12 within which a workpiece 14 is adapted to be inserted for roughly locating the workpiece on base 10. The inner periphery of ring 12 is chamfered as at 16 to facilitate insertion of workpiece 14 in the fixture. Within the periphery of ring 12 on base 10 there are arranged pads 18 for supporting the workpiece vertically. The workpiece 14 illustrated comprises a circular shell 20 having an axially extending peripheral flange 22. It will be appreciated, however, as the description proceeds that the centering device of the present invention is not limited for use with symmetrically shaped workpieces. Workpieces of most any shape can be located and clamped in place by the centering device of the present invention. The shape of the workpiece determines the physical design of the centering device. For purposes of illustration the workpiece 14 is shown as a relatively flimsy circular member which is susceptible to distortion if excessive clamping pressure is applied thereto.

The means for applying clamping pressure to the peripheral flange 22 of workpiece 14 in the embodiment illustrated comprises four pistons 24, 26, 28 and 30 which are arranged as two pairs. These pistons are slidably arranged in cylindrical bores 32 in base 10 and project radially inwardly through locating ring 12. Within each bore 32 there is located a hydraulically actuated chuck generally designated 34. Each chuck 34 comprises an inner sleeve 36 which is slotted to form radially flexible pads 38 and an imperforate outer sleeve 40 which extends circumferentially around inner sleeve 36. An annular groove 42 around outer sleeve 40 is connected by a passageway 44 with a conduit 48. Conduit 48 connects each passageway 44 with a hydraulic pressure intensifier generally designated 50. Intensifier 50 is adapted to supply oil under relatively high pressure to the annular grooves 42 extending around sleeves 40 so as to compress sleeves 40 radially inwardly and cause the flexible pads 38 to frictionally grip and lock the pistons against axial movement.

Each piston in sealed within inner sleeve 36 by an O-ring 52 and is formed at its inner end with an enlarged head 54. The inner end of each cylindrical bore 32 is formed with a recess 56 which forms a hydrostatic oil pocket. A sill 58 is formed around each oil pocket 56. The enlarged head 54 of the piston is adapted to seat against sill 58 when retracted completely in its cylinder. However, when the head 54 of the piston is spaced slightly from sill 58, the clearance space therebetween forms an oil exhaust passageway 60 extending from oil pocket 56 to a drain passageway 62 which leads to a sump.

The radially outer end of each bore 32 is enlarged as at 68 to receive a threaded bushing 70 and a spacer 72. Oil pocket 56 and sill 58 are formed in the radially inner end of each spacer 72. Spacers 72 are sealed within bores 32 by O-rings 74. The sill 58 at the radially inner end of each spacer 72 is provided by a shoulder between each oil pocket 56 and an enlarged bore 76 at the end of spacer 72 in which the head 54 of the piston is located. The portion of spacer 72 surrounding bore 76 abuts against the adjacent end flange 78 of sleeve 36 and is formed with one or more radial passageways 80 which communicate with drain passageway 62.

Each spacer 72 is formed with a central bore 82 which communicates with the inlet port 84 in bushing 70. The inlet ports 84 are connected by conduits 86a, 86b, 86c and 86d with a control valve 88 to which oil is supplied through a conduit 90 from a pump 94. Pump 94 is adapted to supply oil under pressure through valve 88 to each of the inlet ports 84. The supply of oil from pump 94 to valve 88 is controlled by a valve 96 which is preferably operated by a solenoid 98.

Pump 94 preferably also supplies oil under pressure to intensifier 50 through a conduit 100 (FIG. 4). Intensifier is of conventional construction and includes a cylinder 102 in which is arranged an intensifier piston 104, the outer end of which operates in an intensifier cylinder 106. Oil to cylinder 106 is supplied through conduit 100 and branch conduit 101 controlled by a check valve 108. Oil to the opposite ends of cylinder 102 is also supplied through conduit 100 and a branch conduit 103 controlled by a four-way valve 110 operated by a solenoid 112. Solenoid 112 is energized by a timer 114 which is in turn energized with solenoid 98 through a switch, not shown. The arrangement is such that timer 114 energizes solenoid 112 to admit oil to the inner end of cylinder 102 after a predetermined time interval has elapsed following the energizing of solenoid 98.

The function of valve 88 is dual in effect. It produces a pressure drop between pump 94 and each oil pocket 56 and also directs oil to the oil pockets of each opposed pair at variable rates according to the pressures obtaining at the pockets. More specifically, valve 88 is designed such that it directs oil under pressure at a higher rate of flow to the oil pocket at greater pressure and a lower rate of flow to the oil pocket at lower pressure.

Figure 2:
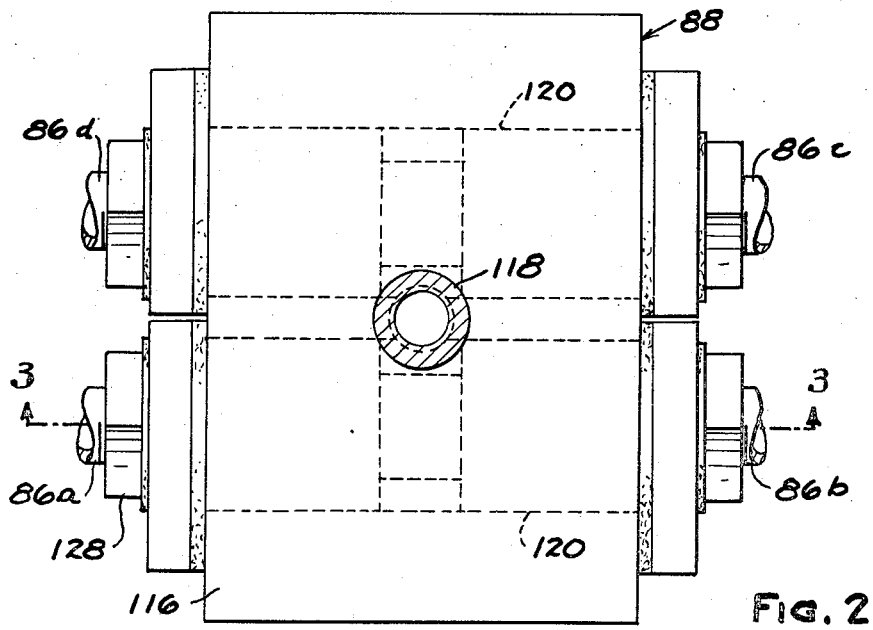
FIGURE 2 is a plan view of the valve.
Figure 3:
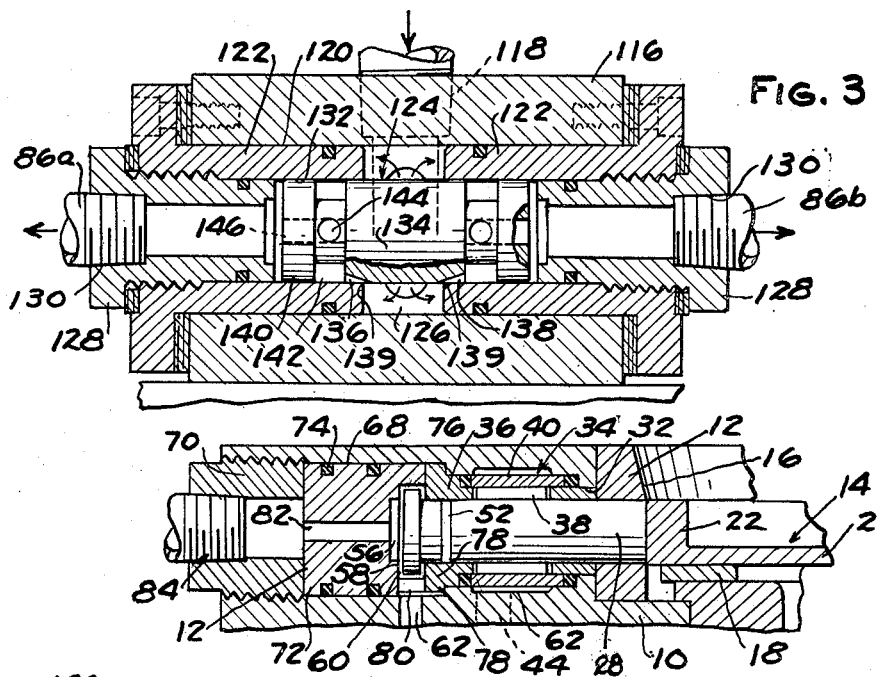
FIGURE 3 is a sectional view taken along the line 3—3 in FIG. 2.

Referring to FIGS. 2 and 3, valve 88 comprises a valve body 116 having an inlet port 118 communicating with a pair of spaced bores 120. Within each bore 120 there is arranged a pair of opposed sleeves 122 in which a spool 124 is axially slidable. Sleeves 122 are spaced apart at their inner opposed ends to form an annular passageway 126 which communicates with inlet port 118. The outer ends of each sleeve 122 are provided with fittings 128 formed with outlet ports 130. Conduits 86a, 86b, 86c and 86d are connected to the outlet ports 130 on fittings 128 as shown in FIG. 2. The length of bore 132 formed by sleeves 122 and between the inner opposed ends of fittings 128 is slightly greater than the length of spool 124 so that spool 124 is capable of shifting axially to a slight extent within bore 132.

The central portion 134 of spool 124 is formed at one side thereof with a pair of grooves 136, 138 which may be of triangular shape and which are of progressively increasing depth in a direction toward the opposite ends of the central portion 134. The axial extent of grooves 136, 138 is determined such that when spool 124 shifts into engagement with the inner end of either of the fittings 128 the adjacent groove on the central portion 134 is substantially closed by shoulder 139 on fitting 128. At each end spool 124 is fashioned with a circular land 140 which is spaced from the central portion 134 by an annular groove 142. Groove 142 communicates with outlet port 130 in fittings 128 through a radial opening 144 and an axial passageway 146 in the end portions of the spool.

With the arrangement described and with spool 124 in a position generally centrally between the inner ends of fittings 128, oil under pressure from inlet port 118 is directed into the annular space 126 and then the flow is divided equally through grooves 136 and 138 to the two conduits connected with the outlet ports 130, conduits 86a and 86b (FIG. 3) in the case of pistons 30 and 28, respectively. It will be appreciated that with the arrangement shown in FIG. 3, for example, if spool 124 shifts to the right the effective cross sectional area of groove 136 will increase and the effective cross sectional area of groove 138 will decrease. Under such circumstances the rate of flow to conduit 86a will be increased and the rate of flow to conduit 86b will be decreased.

In operation a workpiece 14 is inserted within the locating ring 12 and deposited on the support pads 18. Thereafter valve 96 is operated by tripping a switch (not shown) controlling solenoid 98 to direct oil under pressure to the inlet port 118 of valve 88 through conduit 90. As explained above, the oil flows to the annular spaces 126 in bores 120 and then through the grooves 136, 138 to the respective conduits 86a, 86b, 86c and 86d. The spool 124 controlling the flow of oil through conduits 86a and 86b to the oil pockets 56 behind pistons 30 and 28, respectively, is shown in FIG. 3. As the oil pressure in pockets 56 builds up, pistons 30 and 28 are projected radially inwardly into engagement with flange 22 of workpiece 14. Ordinarily when a workpiece is inserted in ring 12 and initially engaged by pistons 30, 28 it would be located slightly off center and the sill clearance behind one of the pistons would be narrower than the sill clearance behind the other piston. Assuming that the sill clearance behind piston 30 is greater than the sill clearance behind piston 28, it follows that the pressure in the oil pocket 56 behind piston 28 will be greater than the pressure in the oil pocket 56 behind piston 30. This differential pressure at the outlet ports 130 for conduits 86a and 86b will produce an unbalanced condition on spool 124 and will tend to shift spool 124 toward the left as viewed in FIG. 3. As spool 124 shifts to the left the effective cross sectional area of groove 138 increases and the effective cross sectional area of groove 136 decreases. Thus, a greater quantity of oil will be diverted to the oil pocket behind piston 28 and the rate of flow of oil to the oil pocket behind piston 30 will be diminished. The force acting on piston 28 to shift it radially inwardly will be increased and the force acting on piston 30 tending to shift it radially inwardly will be decreased. The net result is that the two pistons will respond immediately to this pressure differential and thus seek a balanced condition where the opposed positioning forces on the workpiece will be the same. The workpiece will, therefore, be shifted rapidly to the centered position. The control valve 88 thus imparts to this system a more rapid action and renders the system stiffer to produce more accurate centering of the workpiece.

In the drain passageway 62 there is preferably arranged a spring biased check valve (not shown) or other means for producing a predetermined back pressure in the drain conduit. The purpose for such back pressure creating means in the line to drain is to insure that each piston will be projected inwardly into engagement with the workpiece even in the event that the workpiece is undersize. It will be appreciated that if the workpiece is undersize, the clearance gap between the sill 58 and the head 54 of one or more of the pistons will be too great to provide the necessary hydrostatic effect which results only from an extremely small oil exhaust passageway. However, by providing a restriction in the conduit to drain, a back pressure will always be present to assure that the pistons will in any event be projected inwardly into engagement with the workpiece even though the workpiece may be slightly undersize. For this reason, the total clearance between sill 58 and the flanged end 80 of sleeve 36 is substantially greater than the axial dimension of head 54 and thus substantially greater than the sill passageway required to obtain the hydrostatic bearing action. For example, in a system where the line pressure is about 500 lbs. and the oil pocket pressure about 300 lbs., the pistons were designed to apply approximately 60 lbs. of pressure to the workpiece. The total maximum movement of the pistons was about .030″ while the maximum sill clearance was only about .0035″.

After a predetermined time interval following the energizing of solenoid 98, timer 114 will energize solenoid 112 to direct oil under pressure from conduit 100 and branch conduit 103 through valve 110 to the lower end of cylinder 102. This causes the intensifier piston 104 to travel inwardly of intensifier cylinder 106. Since check valve 108 prevents the flow of oil back through conduit 101, an extremely high pressure is developed in conduit 48 and passageways 44 to collapse sleeves 40 and cause pads 38 to frictionally lock the pistons engaging the workpiece in the centered position thereof. In the event that the hydraulic chucks 34 are not designed to withstand the line pressure of the pump 96 without collapsing, a pressure reducing valve 148 may be employed in branch conduit 101 to restrict the pressure to chucks 34 to a value lower than required to produce locking of the pistons.

The above description of the operation of the device was premised on the assumption that all the oil pockets 56 and all the pistons were of the same size. Since the system is balanced when the opposed forces acting on the workpieces are equal, it follows that the system is in the balanced condition when the product of the area of one oil pocket and the pressure therein is equal to the product of the area of the opposed oil pocket and the pressure therein. Thus, regardless of variations in the sizes of the various components and elements, the position of the workpiece in the balanced condition of the system can in any event be determined and this position is considered as the centered position of the workpiece and utilized for locating tooling, etc. relative to the fixture.

It will be appreciated that the invention is not restricted to the specific embodiment illustrated. Numerous variations in the arrangement of the hydraulic system and the design of the control valve may be made within the scope of the invention. For example whether the work engaging pistons are biased inwardly toward each other or outwardly away from each other will be determined primarily by the configuration of the workpiece and the type of operation to be performed thereon. Likewise although the oil recesses for exerting pressure on the pistons are illustrated as discrete pockets, it is apparent that the formation of these discrete pockets is not essential. The inlet port or duct can itself serve as the oil cavity, the significant feature being the highly restricted exhaust passageway which imparts to the arrangement the hydrostatic bearing effect.

I claim:
1. In combination a pair of pistons for performing work, means forming a pressure chamber adjacent one end of each piston, a source of fluid under pressure, a control valve for directing pressure fluid from said source to each of said chambers, said control valve having a bore therein, a spool having a length shorter than said bore and shiftable axially therein, one of said pressure chambers being connected to said bore at one end of said spool and the other chamber being connected to said bore at the opposite end of the spool, means connecting said pressure fluid source with an intermediate portion of said bore, means including said spool forming a first fluid supply passageway extending from said intermediate bore portion to one end portion of the bore and a second fluid supply passageway extending from said intermediate bore portion to the other end portion of said bore, said spool being movable axially in one direction to increase the effective size of said first passageway and to decrease the effective size of said second passageway and being movable axially in the opposite direction to decrease the effective size of said first passageway and increase the effective size of said second passageway, said spool being movable axially in response to the differential pressure obtaining in said bore portions at the opposite ends of said spool, the pressure at one end portion of said bore varying in response to the pressure in one of said pressure chambers and the pressure in the other end portion of said bore varying in response to the pressure in the other pressure chamber, said differential pressure between the opposite end portions of said bore acting on the spool to shift the spool axially and thereby increase the size of the fluid supply passageway extending to the end portion of the bore at higher pressure and decrease the size of the fluid supply passageway extending to the end of the bore at lower pressure whereby to direct pressurized fluid at a greater rate to the pressure chamber at higher pressure.

2. The combination called for in claim 1 wherein said supply passageways are defined by a pair of oppositely axially extending grooves on the outer surface of the spool which are of progressively increasing cross sectional area in opposite directions.

3. The combination called for in claim 1 wherein said intermediate bore portion includes an enlarged peripheral portion extending at least in part around the axially central portion of the spool, said enlarged bore portion being connected by a pair of shoulders with the portions of said bore on axially opposite sides thereof, said grooves cooperating with said shoulders to determine the effective size of the two oil supply passageways.

4. A hydrostatic centering device for locating a workpiece in a predetermined position comprising a pair of opposed pistons adapted to engage and locate the workpiece, means defining a hydrostatic oil pocket at one end of each piston, means forming a sill adjacent each oil pocket and with which an axial end portion of the adjacent piston cooperates to form a highly restricted oil exhaust passageway from each oil pocket to drain, a source of oil under pressure, a control valve having an inlet port connected to said oil source, said control valve having a pair of outlet ports connected one with each of said oil pockets whereby the pressure in said oil pockets varies inversely with the sill clearance defining said oil exhaust passageway and means in said valve body for directing oil from said inlet port to the outlet ports at a rate proportional to the pressure at said outlet ports so that movement of the piston subject to greater hydrostatic oil pressure in a direction tending to increase the sill clearance and to balance the forces exerted by the two pistons on the workpiece is accelerated.

5. The combination called for in claim 4 wherein said last-mentioned means comprises a valve spool axially shiftable in said bore in response to the pressure differential between said outlet ports.

6. The combination called for in claim 5 wherein said valve body includes a bore in which said valve spool is axially shiftable, said valve spool having a pair of oppositely extending axial grooves thereon, said two grooves being of increasing cross sectional area in opposite directions and means associated with said bore for determining the effective size of said grooves in response to axial shifting of the valve spool.

7. The combination called for in claim 1 wherein said pistons are spaced apart in opposed relation and are adapted to shift a workpiece therebetween to a centered position, said pressure chambers comprising hydrostatic fluid pockets, means forming a sill at each of said pockets and with which an axial end portion of the adjacent piston is adapted to cooperate to form a highly restricted exhaust passageway from each pocket to drain.

References Cited
UNITED STATES PATENTS

| 2,441,925 | 5/1948 | Wege | 269—25 X |
| 2,643,664 | 6/1953 | Willett. | |
| 2,938,351 | 5/1960 | Brooks | 91—412 |
| 3,217,821 | 11/1965 | Dumas. | |

ROBERT C. RIORDAN, Primary Examiner

L. GILDEN, Assistant Examiner

U.S. Cl. X.R.
60—97; 91—412